US008892414B1

(12) United States Patent
Lalgudi et al.

(10) Patent No.: US 8,892,414 B1
(45) Date of Patent: Nov. 18, 2014

(54) TRANSMISSION-LINE SIMULATORS AND METHODS

(75) Inventors: Subramanian N. Lalgudi, Woburn, MA (US); Michael J. Tsuk, Arlington, MA (US)

(73) Assignee: SAS IP, Inc., Cheyenne, WY (US)

( * ) Notice: Subject to any disclaimer, the term of this patent is extended or adjusted under 35 U.S.C. 154(b) by 669 days.

(21) Appl. No.: 12/713,941

(22) Filed: Feb. 26, 2010

(51) Int. Cl.
*G06F 17/50* (2006.01)
*G06F 17/10* (2006.01)

(52) U.S. Cl.
CPC .................................... *G06F 17/10* (2013.01)
USPC .......................................................... 703/13

(58) Field of Classification Search
CPC ...................................................... G06F 17/10
USPC ............................................................ 703/13
See application file for complete search history.

(56) References Cited

U.S. PATENT DOCUMENTS

| 4,303,892 | A | | 12/1981 | Weller et al. |
|---|---|---|---|---|
| 5,313,398 | A | | 5/1994 | Rohrer et al. |
| 5,553,097 | A | * | 9/1996 | Dagher ......................... 375/240 |
| 5,946,482 | A | | 8/1999 | Barford et al. |
| 6,349,272 | B1 | | 2/2002 | Phillips |
| 6,675,137 | B1 | | 1/2004 | Toprac et al. |
| 6,785,625 | B1 | | 8/2004 | Fan et al. |
| 6,832,170 | B2 | | 12/2004 | Martens |
| 6,961,669 | B2 | | 11/2005 | Brunsman |
| 7,034,548 | B2 | | 4/2006 | Anderson |
| 7,127,363 | B2 | | 10/2006 | Loyer |
| 7,149,666 | B2 | | 12/2006 | Tsang et al. |
| 7,389,191 | B2 | | 6/2008 | Furuya et al. |
| 7,539,961 | B2 | | 5/2009 | Dengi et al. |
| 7,627,028 | B1 | | 12/2009 | Frei et al. |
| 7,865,319 | B1 | | 1/2011 | Jacobs et al. |
| 8,063,713 | B2 | | 11/2011 | Cheng et al. |
| 8,245,165 | B1 | | 8/2012 | Tiwary et al. |
| 8,386,216 | B1 | | 2/2013 | Al-Hawari et al. |
| 2003/0208327 | A1 | | 11/2003 | Martens |
| 2007/0038428 | A1 | | 2/2007 | Chen |
| 2007/0073499 | A1 | | 3/2007 | Sawyer et al. |
| 2008/0120083 | A1 | | 5/2008 | Dengi et al. |
| 2008/0120084 | A1 | | 5/2008 | Dengi et al. |
| 2009/0184879 | A1 | | 7/2009 | Derneryd et al. |
| 2009/0284431 | A1 | | 11/2009 | Meharry et al. |
| 2009/0314051 | A1 | | 12/2009 | Khutko et al. |
| 2010/0318833 | A1 | | 12/2010 | Reichel et al. |
| 2011/0010410 | A1 | | 1/2011 | DeLaquil et al. |
| 2011/0218789 | A1 | | 9/2011 | Van Beurden |
| 2011/0286506 | A1 | | 11/2011 | Libby et al. |
| 2012/0326737 | A1 | | 12/2012 | Wen |

OTHER PUBLICATIONS

Vijai K. Tripathi et al., "A SPICE model for multiple coupled microstrips and other transmission lines," 1985, IEEE Transactions on Microwave Theory and Techniques, vol. MTT-33, No. 12, pp. 1513-1518.*

(Continued)

*Primary Examiner* — Kamini S Shah
*Assistant Examiner* — Russ Guill
(74) *Attorney, Agent, or Firm* — Goodwin Procter LLP

(57) ABSTRACT

In various embodiment, a simulator includes an analysis module for extracting transmission-line parameters of a transmission-line system from a network-parameter representation thereof, using discontinuity-detection-based phase unwrapping without introducing artificial discontinuities, and a simulator module for simulating the response of the transmission-line system to an input based on the extracted transmission-line parameters.

17 Claims, 12 Drawing Sheets

(56) References Cited

OTHER PUBLICATIONS

Woopoung Kim et al., "Implementation of Broadband Transmission Line Models with Accurate Low-Frequency Response for High-Speed System Simulations," 2006, DesignCon 2006, 25 pages.*
Jose M. Tribolet, "A new phase unwrapping algorithm," 1977, IEEE Transactions on Acoustics, Speech, and Signal Processing, vol. ASSP-25, No. 2, pp. 170-177.*
Hamid Al-Nashi, "Phase unwrapping of digital signals," 1989, IEEE Transactions on Acoustics, Speech, and Signal Processing, vol. 37, No. 11, pp. 1693-1702.*
Zahi N. Karam et al., "Computation of the One-Dimensional Unwrapped Phase," 2007, Proceedings of the 2007 15th International Conference on Digital Signal Processing, pp. 304-307.*
G. Hebermehl et al., "Improved numerical methods for the simulation of microwave circuits," 1997, Weierstrass Institute for Applied Analysis and Stochastics, pp. 1-14.*
Antoulast A.C., On the Scalar Rational Interpolation Problem, IMA Jrl. of Mathematical Control and Information, 3:61-88 (1986).
Benner et al., Partial Realization of Descriptor Systems, System and Control Letters, 55(11):929-936 (Jun. 13, 2006 preprint).
Blackburn, Fast Rational Interpolation, Reed-Solomon Decoding, and the Linear Complexity Profiles of Sequences, IEEE Transactions on Information Theory, 43(2): 537-548 (Mar. 1997).
Bracken et al, S-Domain Methods for Simultaneous Time and Frequency Characterization of Electromagnetic Devices, IEEE Transactions on Microwave Theory And Techniques, 46(9):1277-1290 (1988).
Cai et al, Displacement Structure of Weighted Pseudoinverses, Applied Mathematics and Computation, -153(2):317-335 (Jun. 4, 2004).
Fitzpatrick, On the Scalar Rational Interpolation Problems, Math, Control Signal Systems, 9:352-369 (1996).
Gallivan et al. Model Reduction MIMO Systems Via Tangential Interpolation, SIAM J Matris Anal. Appl., 26(2):328-349 (2004).
Gallivan et al, Model Reduction via tangental interpolation, MTNS2002 (15th Symp. on the Mathematical Theory of Networks and Systems) (2002) 6 pages.
Gallivan et al, Model Reduction via Transaction: An Interpolation Point of View, Linear Algebra and its Applications, 375:115-134 (2003).
Hiptmair, Symmetric Coupling for Eddy Current Problems, SIAM J. Numer. Anal. 40(1):41-65 (2002).
Lee et al. A Non-Overlapping Domain Decomposition Method with Non-Matching Grids for Modeling Large Finite Antenna Arrays, J. Comput. Phys., 203:1-21 (Feb. 2005).
Lefteriu et al, Modeling Multi-Port Systems from Frquency Response Data via Tangential Interpolation, IEEE, 4 pages (2009).
Li et al, Model Order Reduction of Linear Networks with Massive Ports via Frequency-Dependent Port Packing, 2006 43rd ACM/IEEE Design Automation Conference, pp. 267-272 (2006).
Schrama, Approximate Identification and Control Design with Applicaiton to a Mechanical System. Delft University of Technology, Thesis, 294 pages (1992).
Vandendorpe, Model Reduction of Linear Systems, and Interpolation Point of View, Univ. Catholique de Louvain, Center for Systems Engineering and Applied Mechanics, 162 pages (Dec. 1, 2004).
Woracek, Multiple Point Interpolaton in Nevanlinna Classes, Integral Equations and Operator Theory, 28(1):97-109, (Mar. 1997).
Eisenstadt et al, "S-Parameter-Based IC Interconnect Transmission Line Characaterization," IEEE Transactions on Components, Hybrids, and Manufacturing Technology, vol. 15, No. 4, Aug. 1992, pp. 483-490.
Leung, et al, "Characterization and Attenuation Mechanism of CMOS-Compatible Micromachined Edge-Suspended Coplanar Waveguides on Low-Resistivity Silicon Substrate," IEEE Transactions on Advanced Packaging, vol. 29, No. 3, Aug. 2006, pp. 496-503.
Narita et al, "An Accurate Experimental Method for Characterizing Transmission Lines Embedded in Multilayer Printed Circuit Boards," IEEE Transactions on Advanced Packaging, vol. 29, No. 1, Feb. 2006, pp. 114-121.
Chen, et al, "Per-Unit-Length RLGC Extraction Using a Lumped Port De-Embedding Method for Application on Periodically Loaded Transmission Lines," 2006 Electronic Components and Technology Conference, pp. 1770-1775.
Knockaert, et al, "Recovering Lossy Multiconductor Transmission Line Parameters From Impedance or Scattering Representations," Proceedings of the 10th Topical Meeting on Electrical Performance of Electronic Packaging, Cambridge, MA, Oct. 2001, pp. 35-38.
Knockaert, et al, "Recovering Lossy Multiconductor Transmission Line Parameters From Ipedance or Scattering Representations," IEEE Transactions on Advanced Packaging, vol. 25, No. 2, May 2002, pp. 200-205.
Kim, et al "Implementation of Boradband Transmission Line Models with Accurate Low Frequency response for High-Speed System Simulations," DesignCon 2006, 25 pages, 2006.
Han, et al, "Frequency-Dependent RLGC Extraction for a Pair of Coupled Transmission Lines Using Measured Four-Port S-Parameters," 63rd ARTFG Conference Digest, Jun. 2004, pp. 211-219.
Degerstrom, et al "Accurate Resistance, Inductance, Capacitance, and Conductance (RLCG) From Uniform Transmission Line Measurements," Proceedings of the 18th Topical Meeting on Electrical Performance of Electronic Packaging, Oct. 2008, pp. 77-80.
Oh et al, "Improved Method for Characterizing Transmission Lines Using Frequency-Domain Measurements," Proceedings of the 13th Topical Meeting on Electrical Perofrmance of Electronic Packaging, Jul. 2004, pp. 127-130.
Gruodis, et al, "Coupled Lossy Transmission Line Characterization and Simulation," IBM J. Res. Develop., vol. 25, No. 1, Jan. 1981, pp. 25-41.
Kiziloglu, et al, "Experimental Analysis of Transmission Line Parameters in High-Speed GaAs Digital Circuit Interconnects," IEEE Transactions on Microwave Theory and Techniques, vol. 39, No. 8, Aug. 1991, pp. 1361-1367.
Sampath, "On Addressing the Practical Issues in the Extraction of RLGC Parameters for Lossy Multiconductor Transmission Lines Using S-Parameter Models," Proceedings of the 18th Topical Meeting on the Electrical Performance of Electronic Packaging, Oct. 2008, pp. 259-262.
Lalgudi, et al, "Accurate Transient Simulation of Interconnects Characterization by Band-Limited Data With Propagation Delay Enforcement in a Modified Nodal Analysis Framework," IEEE Transactions on Electromagnetic Compatability, vol. 50, No. 3, Aug. 2008, pp. 715-729.
Hill, et al, "Crosstalk Between Microstrip Transmission Lines," IEEE Transactions on Electromagnetic Compatibility, vol. 36, No. 4, Nov. 1994, pp. 314-321.
Karam, "Computation of the One-Dimensional Unwrapped Phase," Massachusetts Institute of Technology Thesis, Jan. 2006, 101 pages.
Antoulas, A new result on passivity preserving model reduction, Systems & amp: Control Letters, 54(4): 361-374, Apr. 2005.
Astolfi, A new look at model reduction by moment matching for linear systems, Decision and Control, 2007 46th IEEE Conference, pp. 4361-4366, Dec. 12-14, 2007.
Peng et al, Non-conformal domain decompostion method with second-order transmission conditions for timeharmonic electromagnetics, Journal of Computational Physics 229, Apr. 10, 2010, pp. 5615-5629.
Zhao et al, A Domain Decomposition Method With Nonconformal Meshes for Finite Periodic and Semi-Periodic Structures IEEE Transactions on Antennas and Propagation, vol. 55, No. 9, Sep. 2007.
Wolfe et al, A Parallel Finite-Element Tearing and Interconnecting Algorithm for Solution of the Vector Wave Equation with PML Absorbing Medium IEEE Transaction on Antennas and Propagation, vol. 48, No. 2, Feb. 2000.
Gutknecht, Block Krylov Space Methods for Linear Systems with Multiple Right-hand sides: An introduction, pp. 1-22, 2006.
Badics et al, A Newton-Raphson Algorithm With Adaptive Accuracy Control Based on a Block—Preconditioned Conjugate Gradient Technique, pp. 1652-1655, 2005.
Mayo et al., A Framework For The Solution of the Generalized Realization Problem, Linear algebra and its applications 425.2 (2007):634-662.

* cited by examiner

| Cases | $R_{DC}$ | $G_{DC}$ | $Z_c(0)$ |
|---|---|---|---|
| $R_{DC}=0, G_{DC}=10^{-3}$ | NaN | 0 | $\infty$ |
| $R_{DC}=10^{-3}, G_{DC}=0$ | NaN | 0 | $\infty$ |
| $R_{DC}=0, G_{DC}=0$ | NaN | 0 | $\infty$ |
| $R_{DC}=10^{-3}, G_{DC}=10^{-3}$ | $10^{-3}$ | $10^{-3}$ | 1 |

Fig. 10A

| Cases | $R_{DC}$ | $G_{DC}$ | $Z_c(0)$ |
|---|---|---|---|
| $R_{DC}=0, G_{DC}=10^{-3}$ | 0 | $10^{-3}$ | 0 |
| $R_{DC}=10^{-3}, G_{DC}=0$ | $10^{-3}$ | 0 | $\infty$ |
| $R_{DC}=0, G_{DC}=0$ | 0 | 0 | 25 |
| $R_{DC}=10^{-3}, G_{DC}=10^{-3}$ | $10^{-3}$ | $10^{-3}$ | 1 |

Fig. 10B

TRANSMISSION-LINE SIMULATORS AND METHODS

TECHNICAL FIELD

In various embodiments, the present invention relates to simulation systems for the extraction of transmission-line parameters, in particular extraction from the scattering parameters of a transmission-line system.

BACKGROUND

Signal integrity analysis of high-performance electronic systems requires knowledge and utilization of transmission-line parameters such as, e.g., per-unit-length resistance, inductance, conductance, and capacitance matrices (collectively "RLGC parameters") and propagation constants. Transient simulation of transmission lines using their transmission-line parameters tends to be more accurate than direct simulation of network parameters, e.g., scattering (or S-) parameters, of the transmission lines. The scattering parameters typically come from measurements (made, for example, by a vector network analyzer), simulations from numerical three-dimensional electromagnetic solvers, or simulations from circuit solvers or closed-form expressions.

Procedures for the extraction of transmission-line parameters from tabulated network parameters are fairly well known, and typically involve solving the opposite problem—computing network parameters from transmission-line parameters—in reverse (see, e.g., W. R. Eisenstadt and Y. Eo, "S-parameter-based IC interconnect transmission line characterization," *IEEE Trans. on Components, Hybrids, and Manufacturing Technology*, Vol. 15, No.4, pp. 483-490 (1992), the entire disclosure of which is incorporated by reference herein). Most extraction algorithms utilize a discontinuity-detection-based phase-unwrapping algorithm, which converts a sequence of cyclic phases to their noncyclic counterparts by adding integer multiples of $2\pi$ to each cyclic phase. The multiple is the total number of discontinuities in the sequence of cyclic phases observed between zero and a particular frequency (of a cyclic phase) that is more than $\pi$ in amplitude. This algorithm is simple and computationally efficient, but it requires that the input cyclic phase constant not have any artificial discontinuities. In theory, the frequency-dependent phase constants of transmission-line systems are smooth functions of frequency (i.e., have no discontinuities). However, in practice, some artificial and unintentional discontinuities may be present in cyclic phase constants due to numerical artifacts in the extraction algorithm.

Further, the use of discontinuity-detection-based phase unwrapping requires that the tabulated network parameters are known for non-arbitrary frequencies. Specifically, the frequency step and starting frequency cannot be more than a particular data-dependent constant. This constant, a positive number, is inversely proportional to the propagation delay in the transmission lines. When these constraints are not met, the discontinuity-detection-based algorithm cannot be applied reliably. In particular, applying this algorithm to data not meeting the constraints results in the noncyclic phase constant computed from the unwrapping being arbitrary by an integer multiple of $$\frac{2\pi}{l},$$

where $l$ is the length of the line; this arbitrariness results in incorrect values for per-unit-length inductance and capacitance parameters.

Other phase-unwrapping algorithms have been demonstrated in which, unlike the discontinuity-detection-based algorithm, the unwrapped phase at a particular frequency depends only on the wrapped phase at the same frequency, rather than also on the values of the unwrapped phases prior to the particular frequency (see, e.g., L. F. Knockaert, et al., "Recovering lossy multiconductor transmission-line parameter from impedance or scattering representations," *IEEE Trans. on Advanced Packaging*, Vol. 25, No.2, pp. 200-205 (2002), hereafter the "Knockaert reference," the entire disclosure of which is incorporated by reference herein). While such phase-unwrapping algorithms do not impose the above-described numerical challenges, they tend to be computationally inefficient, as their time complexities are exponential with the number of transmission lines. This time complexity increases with the electrical length of the lines. Further, no existing formulation properly handles singularities, resulting in nonphysical discontinuities in transmission-line parameters. Therefore, these alternative phase-unwrapping algorithms may be unsuitable for real-world problems, and there is a need for simulators and simulation methods for the extraction of transmission-line parameters from tabulated network parameters that utilize discontinuity-detection-based phase unwrapping and that are numerically reliable and computationally efficient.

SUMMARY

In various embodiments, the foregoing limitations of existing transmission-line simulations are herein addressed through the use of discontinuity-detection-based phase unwrapping without introducing artificial discontinuities in the cyclic phase constant. Further, prior to extracting the transmission-line parameters, the network-parameter representation of the transmission-line system may be analyzed to determine if discontinuity-detection-based phase unwrapping can be reliably applied. The approach described herein is more accurate and computationally efficient than the prior-art techniques described above.

In an aspect, embodiments of the invention feature a simulator for simulating a transmission-line system comprising at least one transmission line. The simulator includes or consists essentially of an analysis module and a simulator module. The analysis module extracts transmission-line parameters of the transmission-line system from a network-parameter representation thereof using discontinuity-detection-based phase unwrapping without introducing artificial discontinuities. The simulator module simulates the response of the transmission-line system to an input based at least in part on the extracted transmission-line parameters.

The transmission-line system may be lossy or lossless. The simulator may include an input module for receiving the network-parameter representation of the transmission-line system. The simulator may also include a de-embedding module for (a) receiving the network-parameter representation from a measurement system or an electromagnetic field solver, (b) removing measurement artifacts from the network-parameter representation, and (c) sending the network-parameter representation to the input module. The simulated response of the transmission-line system may be a time-dependent response. The simulator may include an output module for supplying the simulated response to a display, a device, and/or another simulator module. Prior to extracting the transmission-line parameters, the analysis module may analyze the network-parameter representation to determine if discontinuity-detection-based phase unwrapping can be reliably applied.

In another aspect, embodiments of the invention feature a method of simulating a transmission-line system comprising at least one transmission line. Transmission-line parameters of the transmission-line system are extracted using discontinuity-detection-based phase unwrapping without introducing artificial discontinuities, and a response of the transmission-line system to an input based on the extracted transmission-line parameters is simulated.

A network-parameter representation of the transmission-line system may be provided, and the transmission-line parameters may be extracted from the network-parameter representation. Providing the network-parameter representation may include or consist essentially of receiving the network-parameter representation from a circuit solver. Providing the network-parameter representation may include or consist essentially of (a) receiving the network-parameter representation from a measurement system or an electromagnetic field solver, and (b) removing measurement artifacts from the network-parameter representation. Prior to extracting the transmission-line parameters, the analysis module may analyze the network-parameter representation to determine if discontinuity-detection-based phase unwrapping can be reliably applied. The transmission-line system may be lossy or lossless. The simulated response of the transmission-line system may be a time-dependent response. The simulating step may produce simulated output values from the modeled transmission-line system, and the output values may be used to drive a device and/or a second simulation.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 10A and 10B are tables of calculated resistance, conductance, and impedance values in accordance with different embodiments of the invention.

DETAILED DESCRIPTION

Simulation System

Figure 1:
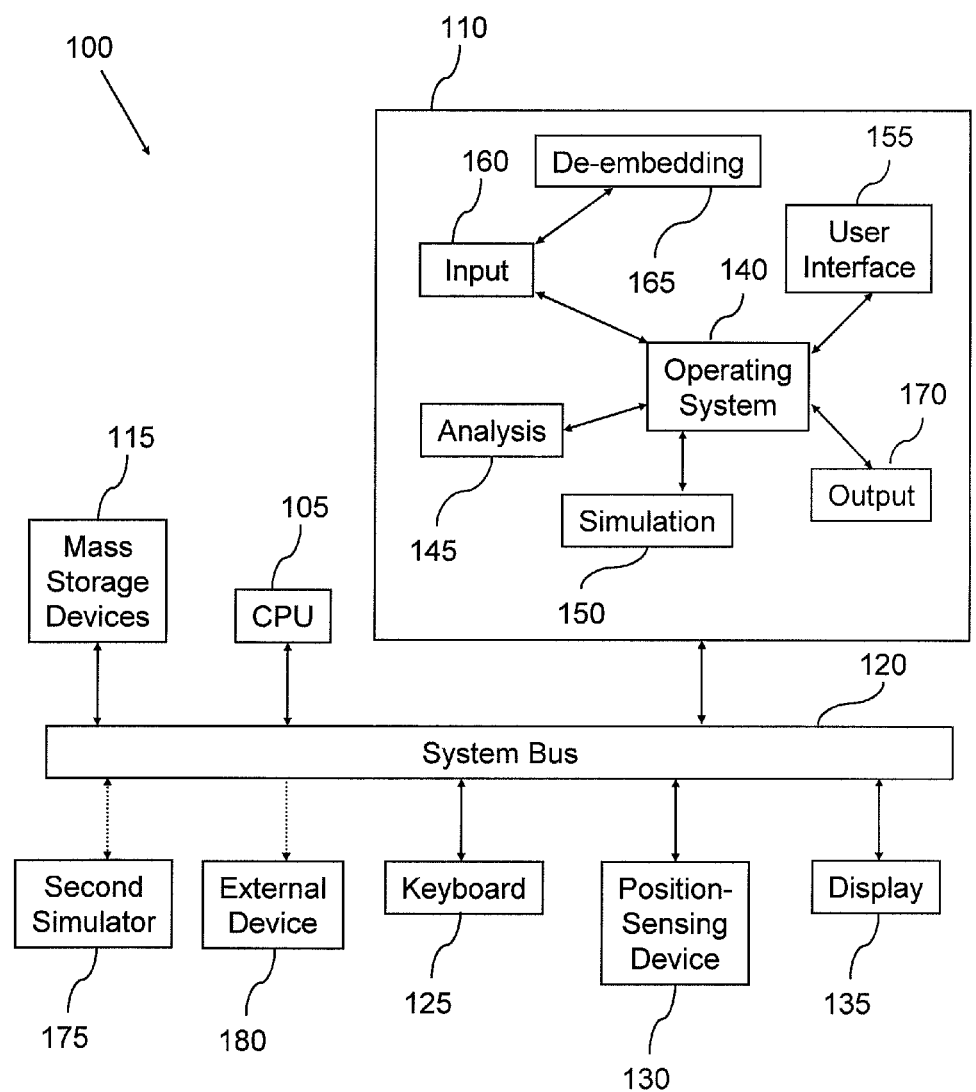
FIG. 1 is a schematic block diagram of an exemplary simulator in accordance with various embodiments of the invention.

Referring to FIG. 1, in various embodiments of the invention, a simulator 100 includes a central-processing unit (CPU) 105, a main memory 110, and one or more mass storage devices 115 all connected to a system bus 120, over which all of the components of the system communicate. CPU 105 directs the operation of simulator 100, and each mass storage device 115 stores, e.g., input data and/or output data for retrieval and/or further processing. A user may interact with simulator 100 using a keyboard 125 and/or a position-sensing device (e.g., a mouse or trackball) 130. The output of either device may be used to designate information or select particular areas of a display 135 to direct functions to be performed by simulator 100.

The main memory 110 contains a group of modules that control the operation of CPU 105 and its interaction with other hardware components. An operating system 140 directs the execution of low-level, basic system functions such as memory allocation, file management, and operation of mass storage devices 115. At a higher level, an analysis module 145 and a simulation module 150 direct execution of the primary functions performed by embodiments of the invention, as discussed below, and a user interface module 155 enables straightforward interaction with simulator 100 over display 135.

An input module 160 accepts input data corresponding to a system or network to be simulated from, e.g., a mass storage device 115, keyboard 125, and/or position-sensing device 130, or in some implementations, from an external signal source. The input data may include or consist essentially of digitized information corresponding to the system to be simulated, i.e., one or more transmission lines. For example, the input data may be values representing S-parameters and/or lengths of the transmission lines. Generally, the input data will be a representation of the system in the frequency domain. An optional de-embedding module 165 removes any artifacts (e.g., the effects of measurement probes, connectors, etc.) from the input data. De-embedding may be performed by, e.g., procedures described in W. Kim, et al., "Implementation of broadband transmission line models with accurate low-frequency response for high-speed system simulations," *DesignCon* 2006 *Technical Paper Proceedings*, the entire disclosure of which is incorporated by reference herein. Alternatively, input module 160 may directly accept as input data the set of S-parameters (de-embedded or otherwise), obviating the need for processing by de-embedding module 165.

An output module 170 directs output data from analysis module 145 and/or simulation module 150 to, e.g., a mass storage device 115 for storage, display 135 for presentation, a second simulator 175 for further analysis and/or simulation, and/or an external device 180 to operate as an input thereto (e.g., as a control signal to an electronic device).

Although the modules in main memory 110 have been described separately, this is for clarity of presentation only. As long as simulator 100 performs all necessary functions, it is immaterial how they are distributed therewithin and the programming or hardware architecture of simulator 100. Furthermore, the above-described implementation is exemplary only. Other hardware approaches are possible, e.g., the various modules of embodiments of the invention may be implemented on a general-purpose computer programmed with appropriate software instructions implementing the functions described below, or as hardware circuits (e.g., as an application-specific integrated circuit, or ASIC), or as mixed hardware-software combinations.

Simulation Method

Figure 2:
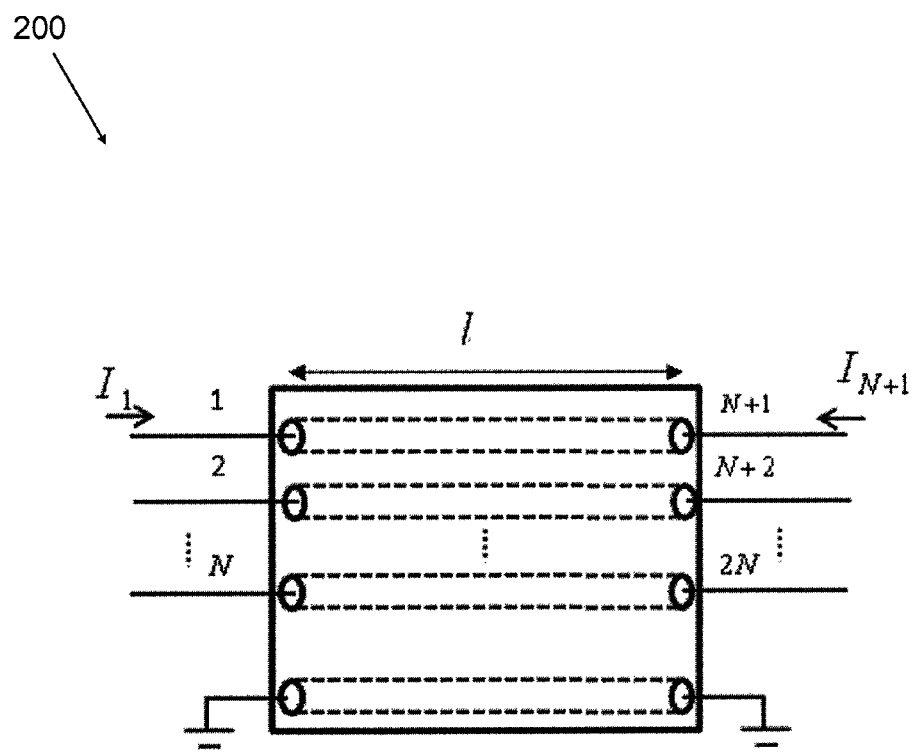
FIG. 2 is a schematic of an exemplary transmission-line system modeled in accordance with various embodiments of the invention.

The simulation method according to various embodiments of the invention is described below, beginning with the well-known prior-art formuation for the extraction of transmission-line parameters in reference to FIGS. 2 and 3. An exemplary transmission-line system 200, which may be lossy or lossless, consists of N lines excluding the ground conductor, each of length l. In step 300, simulator 100 receives input data, e.g., the network parameters and line lengths, as described above. For example, the input data may be received from input module 160 or may be received directly from the second simulator 175 or from a mass storage device 115. The input data will generally include or consist essentially of a set of de-embedded network parameters; if the input data is in a raw form from, e.g., a measurement system or a numerical electromagnetic simulator, it may first be processed in de-embedding module 165 to remove any measurement artifacts.

In step 310, the input data is reordered in order of increasing frequency to facilitate the discontinuity-detection-based phase-unwrapping algorithm used to extract the propagation constants (described below in reference to step 320).

For exemplary transmission-line system 200, in step 300 simulator receives input data including or consisting essentially of the 2N-port tabulated network parameters, i.e., S-/Y-/Z-/ABCD-parameters, along with l. The tabulated parameters are known for $N_f$ frequencies $\{f_1, f_2, \ldots, f_{N_f}\}$. As described below, simulator 100 extracts transmission-line parameters, including the RLGC parameters, from the tabulated network parameters, l, and an upper bound for the relative dielectric constant of the dielectric, $\epsilon_{r_{ub}}$. If $\epsilon_{r_{ub}}$ is not known, some reasonably large value is assumed, e.g., $\epsilon_{r_{ub}}=15$.

The two ends of each transmission line (or, the ports) are represented by $z=0$ and $z=l$. $T(\omega) \in C^{2N \times 2N}$ denotes the multiport transmission parameters (i.e., the ABCD-parameters) of the lines. Ports on one side of the lines are numbered first followed by the ports on the other side; thus, if i refers to a port of a line at $z=0$, then the port on the other side is numbered N+i (see FIG. 2). $R(\omega)$, $L(\omega)$, $G(\omega)$, and $C(\omega)$, all $\in R^{N \times N}$, are the frequency-dependent per-unit-length resistance, inductance, conductance, and capacitance matrices, respectively. These matrices are symmetric, as is known in the art.

The derivation of $R(\omega)$, $L(\omega)$, $G(\omega)$, and $C(\omega)$ from $T(\omega)$ begins with formulating the relationship therebetween, as is known in the art. $V(z) \in C^{N \times 1}$ represents the vector of voltages across the lines at a distance z and $I(z) \in C^{N \times 1}$ is the vector of currents flowing along the lines from $z=0$ to $z=l$ at a distance z. The transmission line equations in the frequency domain may be written as:

$$-\frac{\partial V(z, \omega)}{\partial z} = Z(\omega) I(z, \omega), \quad (1)$$

$$-\frac{\partial I(z, \omega)}{\partial z} = Y(\omega) V(z, \omega), \quad (2)$$

where $Z(\omega)$ is the per-unit-length impedance of the lines, defined as $Z(\omega)=R(\omega)+j\omega L(\omega)$. Similarly, $Y(\omega)=G(\omega)+j\omega C(\omega)$ is the per-unit-length admittance of the lines. The matrix $R(\omega)$ may be decomposed as:

$$R(\omega)=R_{DC}+R_s(\omega), \quad (3)$$

where $R_{DC}$ is the DC resistance matrix and $R_s(\omega)$ is the remaining part of the resistance matrix. The matrix $R'_s(0)=0$. The matrix $L(\omega)$ may be decomposed as:

$$L(\omega)=L_e+L_i(\omega), \quad (4)$$

where $L_e$ is the external inductance matrix and $L_i(\omega)$ is the internal inductance matrix. The matrix $L_i(\infty)=0$. The matrix $G(\omega)$ may be decomposed as:

$$G(\omega)=G_{DC}+G_d(\omega), \quad (5)$$

where $G_{DC}$ is the DC conductance matrix and $G_d(\omega)$ is the remaining part of the conductance matrix. The matrix $G_d(0)=0$.

Both $Z(\omega)$ and $Y(\omega)$ are also symmetric, as is known in the art. Also known is the fact that the matrix product $Z(\omega)Y(\omega)$ can be diagonalized for most transmission-line configurations through the eigenvalue decomposition:

$$Z(\omega)Y(\omega)=E(\omega)\gamma(\omega)^2 E(\omega)^{-1}, \quad (6)$$

where $E(\omega) \in C^{N \times N}$ is the nonsingular matrix of eigenvectors, and $$\gamma(\omega)=\text{diag}\{\gamma_1(\omega), \gamma_2(\omega), \ldots, \gamma_N(\omega)\}, \quad (7)$$

where $\gamma_i(\omega) \in C$ is the $i^{th}$ propagation constant. Each $\gamma_i(\omega)=\alpha_i(\omega)+j\beta_i(\omega)$, where $\alpha_i(\omega) \in R$ is the $i^{th}$ attenuation constant, $\beta_i(\omega) \in R$ is the $i^{th}$ phase constant, and $j=\sqrt{-1}$. Also, $\alpha_i(\omega) \geq 0$ and $\beta_i(\omega) \geq 0$ $\forall i$ and for $\omega \geq 0$. Further, $\alpha_i(\omega)$ is decomposed into:

$$\alpha_i(\omega)=\alpha_{i_{DC}}+\alpha_{i_s}(\omega), \quad (8)$$

where $\alpha_{i_{DC}}$ is the DC value of the $i^{th}$ attenuation constant, and $\alpha_{i_s}(\omega)$ is the remaining part of $\alpha_i(\omega)$. Further, $\alpha_{i_s}(0)=0$.

Next, matrix $\Gamma(\omega) \in C^{N \times N}$ is defined as:

$$\Gamma(\omega)=E(\omega)\gamma(\omega)E(\omega)^{-1}. \quad (9)$$

The characteristic impedance matrix, $Z_c(\omega) \in C^{N \times N}$, is then computed from $\Gamma(\omega)$ and $Z(\omega)$ as:

$$Z_c(\omega)=\Gamma(\omega)^{-1} Z(\omega), \quad (10)$$

and is known in the art to be symmetric. The transmission matrix $T(\omega)$ is defined as follows:

$$\begin{bmatrix} V(0, \omega) \\ I(0, \omega) \end{bmatrix} = T(\omega) \begin{bmatrix} V(l, \omega) \\ I(l, \omega) \end{bmatrix} \quad (11)$$

where $$T(\omega) = \begin{bmatrix} A(\omega) & B(\omega) \\ C(\omega) & D(\omega) \end{bmatrix}, \quad (12)$$

and the matrices $A(\omega)$, $B(\omega)$, $C(\omega)$, and $D(\omega)$ are:

$$A(\omega)=\cos h(\Gamma(\omega)l),$$

$$B(\omega)=\sin h(\Gamma(\omega)l) Z_c(\omega),$$

$C(\omega)=Z_c(\omega)^{-1}\sin h(\Gamma(\omega)l)$, and $D(\omega)=Z_c(\omega)^{-1}\cos h(\Gamma(\omega)l)Z_c(\omega)$, (13)

where the quantities $\cos h(\Gamma(\omega)l)=E(\omega)\cos h(\gamma(\omega)l)E(\omega)^{-1}$, and $\sin h(\Gamma(\omega)l)=E(\omega)\sin h(\gamma(\omega)l)E(\omega)^{-1}$. (14)

As described above, in various embodiments the input data corresponds to l and the A, B, C, and D matrices on the left-hand side of equation (13) for frequencies $f_1 \ldots f_{N_f}$. In step 320, the propagation constants are extracted. From equations (13) and (14), the matrix $A(\omega)$ is expressed as:

$A(\omega)=E(\omega)\cos h(\gamma(\omega)l)E(\omega)^{-1}$. (15)

Since $\cos h(\gamma(\omega)l)$ is a diagonal matrix, both $\gamma(\omega)$ and $E(\omega)$ may be obtained from the eigenvalue decomposition of $A(\omega)$. Denoting $\psi(\omega)$ as the diagonal matrix of eigenvalues of $A(\omega)$, one might compute $\gamma(\omega)$ as $$\frac{1}{l}\cos h^{-1}(\Psi(\omega)).$$

However, this value of $\gamma(\omega)$ is only the principal value of the propagation constant and therefore may not be the true value. If $w=\cos h(z)$, where w and z are complex numbers, then w is also equal to $\cos h(z+j2\pi n)$, where n is an integer. Therefore, the value of $\cos h^{-1}(w)$ is arbitrary by $j2\pi n$. The value of $\cos h^{-1}(w)$ for $n=0$ is the principal value and may not be true solution. Denoting PV[z] as the principal value of z, it is inferred that $PV[\gamma(\omega)l]=\cos h^{-1}(\psi(\omega))$. (16)

Therefore, the product $\gamma(\omega)l$ is:

$\gamma(\omega)l=PV[\gamma(\omega)l]+j2\pi\zeta(\omega)$, (17)

where $\zeta(\omega)\in Z^{N\times N}$ is a diagonal matrix with integer entries. From equation (17), it follows that the correct $\gamma(\omega)l$ differs from the $PV[\gamma(\omega)l]$ only by an imaginary number. Then, the real part of $\gamma(\omega)l$, namely $\Re[\gamma(\omega)l]$, is the same as that of $PV[\gamma(\omega)l]$. Therefore, the attenuation constant, $\alpha(\omega)$, is computed as $$\alpha(\omega)=\frac{\Re[PV[\gamma(\omega)l]]}{l}.$$ (18)

From equations (16) and (17), $\beta l$ is written as:

$\beta(\omega)l=PV[\beta(\omega)l]+2\pi\zeta(\omega)$. (19)

$\zeta(\omega)$ in equation (19) is calculated by phase unwrapping, in preferred embodiments performed by a discontinuity-detection-based phase-unwrapping algorithm. Once $\gamma(\omega)$ is known from equations (16)-(19), matrix $\Gamma(\omega)$ is computed from equation (9) using E, known already from equation (15).

In step 330, the characteristic impedance matrix $Z_c(\omega)$ is extracted from $B(\omega)$ and $\Gamma(\omega)l$ using equation (13):

$$Z_c(\omega)=(\sinh(\Gamma(\omega)l))^{-1}B(\omega) \quad (20)$$
$$=E(\omega)(\sinh(\gamma(\omega)l))^{-1}E(\omega)^{-1}B(\omega)$$
$$=E(\omega)(\sinh(PV[\gamma(\omega)l]))^{-1}E(\omega)^{-1}B(\omega).$$

The final step in equation (20), which does not involve any unwrapped quantities, follows from equation (17) and the properties of the hyperbolic sine function. Therefore, the phase constant need not be unwrapped to compute $Z_c(\omega)$.

Finally, in step 340, the transmission-line parameters are extracted. From equations (20) and (10), the matrix $Z(\omega)$ is computed:

$$Z_c(\omega)=\Gamma(\omega)Z_c(\omega) \quad (21)$$
$$=E(\omega)\gamma(\omega)(\sinh(\gamma(\omega)))^{-1}E(\omega)^{-1}B(\omega).$$

And, from equations (21), (6), and (9), the matrix $Y(\omega)$ is computed:

$$Y(\omega)=Z_c(\omega)^{-1}\Gamma(\omega) \quad (22)$$
$$B^{-1}E(\omega)\sinh(\gamma(\omega))\gamma(\omega)E^{-1}.$$

Then, from equations (21) and (22), the matrices $R(\omega)$, $L(\omega)$, $G(\omega)$, and $C(\omega)$ are computed:

$R(\omega)=\Re[Z(\omega)]$, (23)

$$L(\omega)=\frac{\Im[Z(\omega)]}{\omega}, \quad (24)$$

$G(\omega)=\Re[Y(\omega)]$, (25)

and $$C(\omega)=\frac{\Im[Y(\omega)]}{\omega}. \quad (26)$$

The phase constant is unwrapped during computation of $Z(\omega)$ and $Y(\omega)$ (and thus influences $R(\omega)$, $L(\omega)$, $G(\omega)$, and $C(\omega)$, as a result): as $\gamma(\omega)$ also appears outside of the hyperbolic sine function in equations (21) and (22), $Z(\omega)$ computed with and without unwrapped phase are typically different. Also, from equation (24), the quantity $\Im[Z(\omega)]$ should increase with $\omega$, to prevent $L(\omega)$ from becoming zero. However, $\Im[Z(\omega)]$ will generally not increase if the phase constant was not unwrapped (the same argument applies for $C(\omega)$ in equation (26)).

Figure 3:
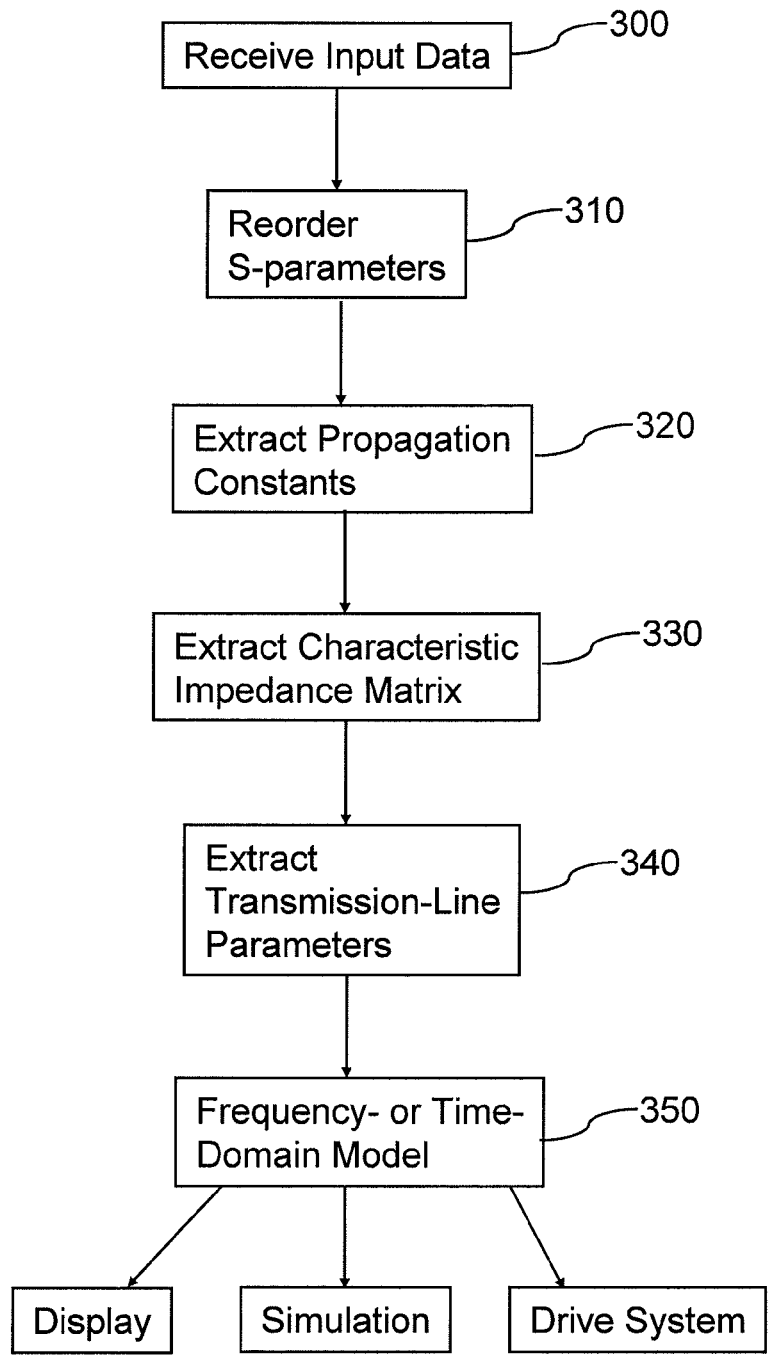
FIG. 3 is a schematic flowchart of an exemplary simulation method in accordance with various embodiments of the invention.

Still referring to FIG. 3, in step 350, the transmission-line parameters extracted in step 340 are utilized in a frequency- or time-domain simulation by simulation module 150. The transmission-line parameters may be straightforwardly embedded within a transient simulator, e.g., NEXXIM, available from Ansoft, LLC of Pittsburgh, Pa.; such simulators are designed to accept and base simulation on transmission-line parameters. As indicated in FIG. 3, the outputs of such simulations may be utilized as inputs for further simulations or may be displayed in text or graphical form, e.g., on display 135. The outputs may also be utilized to drive actual systems, e.g., the output of a transient simulation of a transmission-line system may be utilized to drive an external electronic circuit 180 connected to simulator 100 via, e.g., an analog/digital converter.

Eigenvalue Position

In various implementations, the simulation method described above is not robust. For example, the discontinuitydetection-based phase-unwrapping algorithm utilized in step 320 may introduce artificial discontinuities. Specifically, during operation of simulator 100 the algorithm computes the unwrapped phase of ith phase constant, $\beta_{i,i}$, at frequency $f_k$, namely $\beta_{i,i}(\omega_k)l$, from its wrapped counterpart, $PV[\beta_{i,i}(\omega_k)l]$, as:

$$\beta_{i,i}(\omega_k)=PV[\beta_{i,i}(\omega_k)l]+2\pi d_{i,i}(\omega_k), \quad (27)$$

where $d_{i,i}(\omega_k)$ is the number of discontinuities from $\omega_1$ through $\omega_k$ of more than $\pi$ in magnitude among the differences between adjacent values of $PV[\beta_{i,i}(\omega_k)l]$. Thus, the discontinuity-detection-based phase-unwrapping algorithm is generally accurate, simple to implement, and computationally efficient (i.e., memory and runtime scale linearly with $N_f$). However, in various embodiments, the algorithm operates incorrectly, leading to gross inaccuracies in the values of the extracted transmission-line parameters.

In a first exemplary embodiment, the eigenvalues of $A(\omega)$ do not retain their respective positions in $\psi(\omega)$ with frequency. That is, if r is an eigenvalue of A whose position as a function of frequency is being sought, and if $r(\omega_{k-1})$ is at the $i^{th}$ diagonal element of $\psi(\omega_{k-1})$, then $r(\omega_k)$ need not be at the $i^{th}$ diagonal element of $\psi(\omega_k)$. Instead, $r(\omega_k)$ may be at one of the other N−1 diagonal locations in $\psi(\omega_k)$. In such an embodiment, the phases $PV[\beta_{i,i}(\omega_k)l]$ and $PV[\beta_{i,i}(\omega_{k-1})l]$ computed from equation (16) may not be phases of the same phase constant, and the unwrapped phase computed from equation (27) may not correspond to one particular phase constant. Because $\beta_i(\omega_k) \neq \beta_j(\omega_k)$ for $i \neq j$, discontinuities result in $PV[\beta_{i,i}(\omega_k)l]$. Accordingly, discontinuities also result in the extraction of $\gamma_{i,i}(\omega_k)$, $R(\omega_k)$, $L(\omega_k)$, $G(\omega_k)$, and $C(\omega_k)$. And, in some embodiments, $d_{i,i}(\omega_k)$ is extracted incorrectly. These discontinuities lead to inaccuracies when the transmission-line parameters are extracted. Because there must be at least two eigenvalues of $A(\omega)$ for them to swap positions in $\psi(\omega)$, the above-described discontinuities generally result only for transmission-line systems having two or more lines.

Figure 4A:
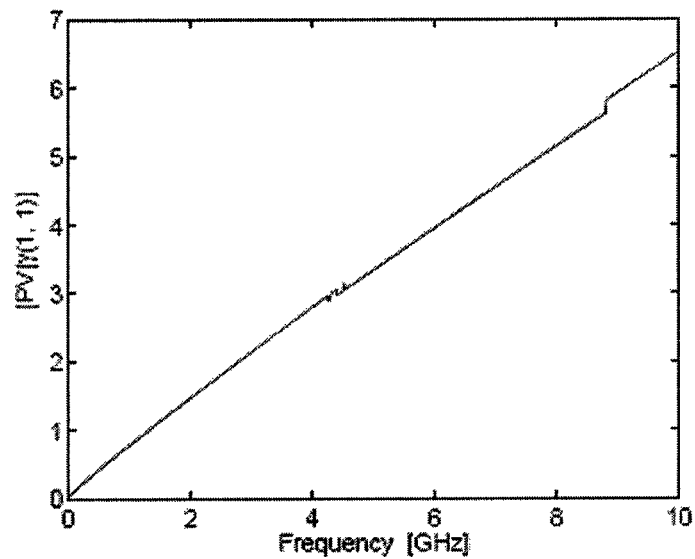
FIGS. 4A and 4B are plots of attenuation constant and the corresponding wrapped phase constant as a function of frequency, respectively, in accordance with embodiments of the invention when eigenvalue relative positions are not preserved.
Figure 4B:
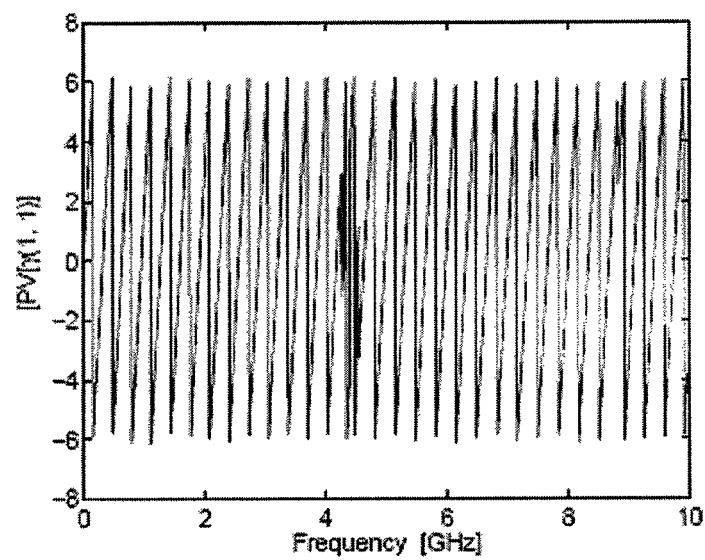
Figure 5A:
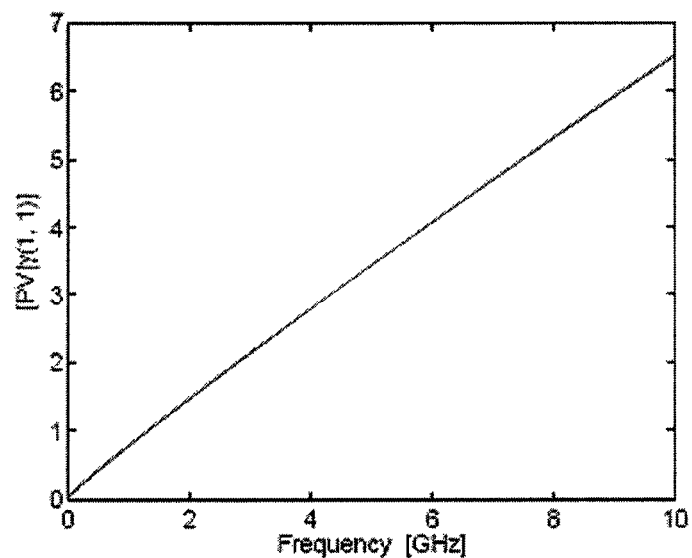
FIGS. 5A and 5B are plots of attenuation constant and the corresponding wrapped phase constant as a function of frequency, respectively, in accordance with embodiments of the invention when eigenvalue relative positions are preserved.
Figure 5B:
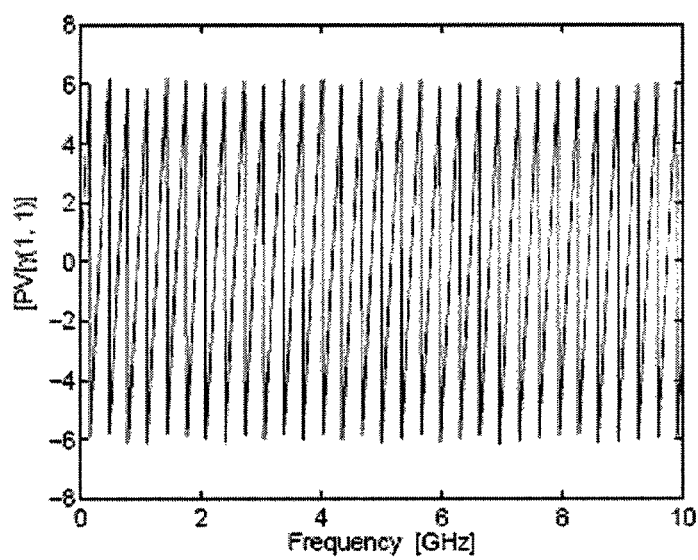

Embodiments of the present invention prevent artificial discontinuitites during step 320 by preserving the position of each eigenvalue of $A(\omega)$ with frequency, i.e. (as described above), the position of r in $\psi$ is held constant for varying $\omega_k$. Because propagation constants of transmission-line systems tend to be close in value, it may be difficult to hold each eigenvalue's position constant by tracking its value; but the respective positions of the eigenvalues may be held constant relatively easily by instead tracking the position of the eigenvectors. The eigenvectors corresponding to the eigenvalues are orthogonal to each other at a particular frequency, and the eigenvectors corresponding to an eigenvalue at two nearby frequencies tend to be oriented in nearly the same direction. That is, if $e(\omega_{k-1}) \in C^{N \times 1}$ represent the eigenvector corresponding to $r(\omega_{k-1})$, then $e(\omega_{k-1})$ and $e(\omega_k)$ are oriented in approximately the same direction, or equivalently $e(\omega_{k-1})^H e(\omega_k) \approx 1$. This property is used to find the new position, say j, of each eigenvalue $\psi_{i,i}(\omega_{k-1})$. If $j \neq i$, then $\psi_{j,j}(\omega_k)$ is moved to $\psi_{i,i}(\omega_k)$, and the corresponding eigenvector is also relocated to the $i^{th}$ column Example In an exemplary embodiment, the transmission-line parameters of a six-line transmission-line system are extracted from its S-parameters. The S-parameters are known from 10 MHz to 10 GHz with a uniform spacing of 10 MHz. The length, l, is 0.508 m. In this case, the transmission-line parameters were already known and were used to compute the S-parameters, in order to demonstrate discontinuity avoidance in accordance with embodiments of the invention. The transmission-line parameters were computed from the S-parameters with and without preserving the relative positions of eigenvalues. FIGS. 4A and 4B depict, respectively, the real and imaginary parts of $PV[\gamma_{1,1}(\omega)]$ (see equation (16)), which are shown as a function of frequency when the eigenvalue positions are not preserved, and the resulting discontinuities in each. Such discontinuities directly result in inaccuracies during extraction of the transmission-line parameters. FIGS. 5A and 5B depict the corresponding quantities extracted with preservation of eigenvalue position, as described above. As shown in FIGS. 5A and 5B, preserving eigenvalue position prevents introduction of artificial discontinuities during phase unwrapping.

Phase Constant Sign

In various embodiments, the discontinuity-detection-based phase-unwrapping algorithm computes $d_{i,i}(\omega_k)$ incorrectly, primarily for lossless transmission-line systems, due to random (i.e., unpredictable) changes in the sign of $PV[\beta_{i,i}(\omega_k)l]$ with $\omega_k$ (equivalent to a discontinuity of more than $\pi$ in magnitude in $PV[\beta_{i,i}(\omega_k)l]$. In theory, for lossless lines, values of $\gamma_{i,i}(\omega_k)$ are imaginary, which implies that values of $\psi_{i,i}(\omega_k)$ are real. However, in practice, e.g., when S-parameters are obtained from microwave circuit simulators, $\psi_{i,i}(\omega_k)$ has a nonzero but approximately negligible imaginary part. The quantity $\beta_{i,i}(\omega_k)$ has the same sign as $\Im[\psi_{i,i}(\omega_k)]$. Because $|\Im[\psi_{i,i}(\omega_k)]|$ is approximately negligible, the sign of $\Im[\psi_{i,i}(\omega_k)]$ is typically random, leading to a corresponding randomness in the sign of $\beta_{i,i}(\omega_k)$. For lossy lines, this scenario typically does not occur, as $|\Im[\psi_{i,i}(\omega_k)]|$ (or alternatively $\alpha_{i,i}(\omega)$) is not negligible.

In various embodiments, correcting for random fluctuations of the sign of $PV[\beta_{i,i}(\omega_k)l]$ enables the accurate extraction of transmission-line parameters. In such embodiments, merely ignoring the sign of $PV[\beta_{i,i}(\omega_k)l]$ by making it non-negative is insufficient, as $PV[\beta_{i,i}(\omega_k)l]$ is typically negative for some k. Thus, in preferred embodiments, $PV[\beta_{i,i}(\omega_k)l]$ is reconstructed from its magnitude, $|PV[\beta_{i,i}(\omega_k)l]|$. Then, the correct sign of $PV[\beta_{i,i}(\omega_k)l]$ is determined from the slope of $|PV[\beta_{i,i}(\omega_k)l]|$ at $f_k$ (in general, the sign of $PV[\beta_{i,i}(\omega_k)l]$ is same as the sign of the slope of $|PV[\beta_{i,i}(\omega)_k)l]|$). With this reconstruction, the aforementioned harmful effects are avoided.

Example

In an exemplary embodiment, the S-parameters of a lossless transmission line are obtained from a commercial microwave simulator. The length of the line is 75 mm, and its characteristic impedance is 25 Ω. Air is the dielectric medium. The S-parameters are obtained for frequencies from 1 MHz to 5 GHz with a uniform spacing of 1 MHz. For comparison in this example, analytical values for the transmission line parameters may be computed. The attenuation constant, α, is zero for a lossless line. The phase constant, β(f), is $$\frac{2\pi f}{c},$$

where c is the velocity of light in air. The matrices $R(\omega)$ and $G(\omega)$ are zero for a lossless line, and $L(\omega)$ and $C(\omega)$ may be analytically computed as 83.33 nH/m, and 0.133 nF/m, respectively.

Figure 6A:
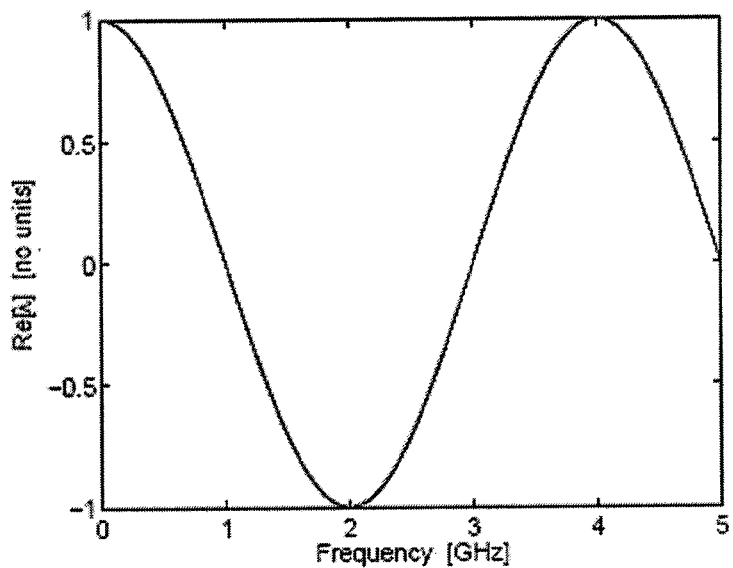
FIGS. 6A and 6B are plots of the real and imaginary parts of $\psi_{1,1}(\omega)$ as a function of frequency, respectively, for a lossless line, extracted from network parameters from a circuit simulator in accordance with various embodiments of the invention.
Figure 6B:
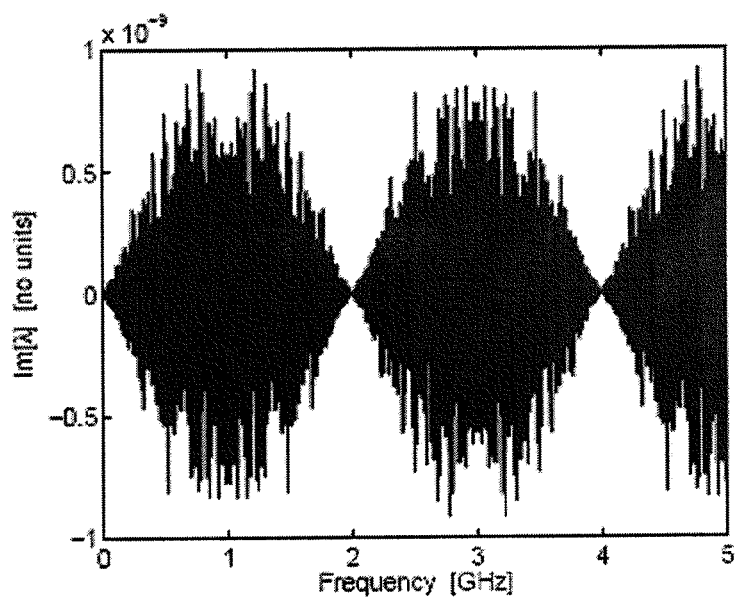
Figure 7:
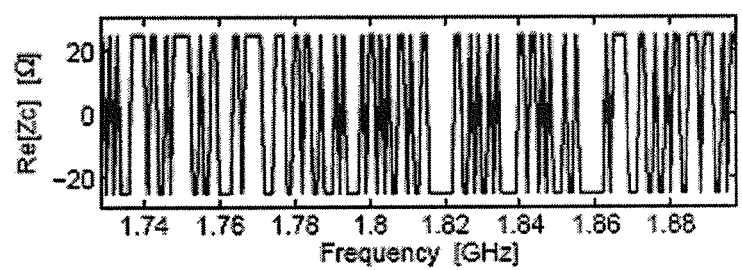
FIG. 7 is a plot of the real part of the characteristic impedance for a lossless line when random oscillations in the sign of the phase constant are not corrected in accordance with various embodiments of the invention.

FIGS. 6A and 6B depict, respectively, the extracted real and imaginary parts of $\psi_{1,1}(\omega)$ for this example. As shown in FIG. 6B, $|\Im[\psi_{1,1}(\omega)]|$ is a nonzero but negligible number, and the sign of $\Im[\psi_{1,1}(\omega)]$ randomly fluctuates with frequency. FIG. 7 depicts the corresponding extracted real part of the characteristic impedance for the transmission line. As shown in FIG. 7, $Z_c(\omega)$ is incorrectly computed with random fluctuations in the sign of its real part. These discontinuities resulting from the random sign fluctuations directly result in spurious values for the extracted transmission-line parameters. When the sign fluctuations are corrected for, as described above, the extracted transmission-line parameters closely match the values derived analytically due to the non-introduction of artificial discontinuities during phase-unwrapping.

Reliable Application of Discontinuity-Detection-Based Phase Unwrapping

In various embodiments, prior to extraction of the transmission-line parameters, simulator 100 first determines if the discontinuity-detection-based phase-unwrapping algorithm may be reliably applied to the input data. The unwrapped phase computed from the discontinuity-detection-based algorithm may be arbitrary by an additive factor of $2n\pi$, where n is an integer (see equation (27)). To illustrate this, the wrapped phase $PV[\beta(\omega)l]$ is assumed to have a constant periodicity of $f_c$, implying that there is one discontinuity of more than $\pi$ in magnitude among the values obtained by subtracting the adjacent values of the wrapped phases in a span of $f_c$ frequency. Thus, the unwrapped phases computed from considering the first k cycles (or periods) of $PV[\beta(\omega)l]$ are same as those computed from considering the next k cycles (i.e., from k+1 to 2k cycles), as both cases will have the same number of discontinuities (the factor d in equation (27)). In general, the same unwrapped phases are computed considering any k consecutive cycles. However, the same unwrapped phase is computed even if the k cycles are not consecutive—a spurious result. Although all of the results with k cycles are the same, only one result is the correct one—the one obtained from the first k cycles. The other results differ from this correct result by multiples of $2\pi$. Therefore, it is necessary to make sure no cycles of $PV[\beta(\omega)l]$ are omitted.

Unfortunately, when the input data includes or consists essentially of tabulated data, some cycles of $PV[\beta(\omega)l]$ may be omitted, as when the data are tabulated, the S-parameters are known generally only at discrete frequencies. Therefore, in some embodiments or applications, the S-parameters (and therefore $PV[\beta(\omega)l]$) are not known for some cycles of $PV[\beta(\omega)l]$.

To ensure that no cycles are omitted, during step 300 simulator 100 ensures that the input data meets two conditions for discontinuity-detection-based phase unwrapping to be applied. First, the first cycle of $PV[\beta(\omega)l]$ (the one that starts at $\omega=0$) should clearly not be omitted, thus forcing starting frequency, $f_1$, to be within the first cycle. In other words, $f_1$ is less than the periodicity of the first cycle. Second, the maximum frequency step, $\max\{f_{k+1}-f_k\}$, should be less than the periodicity of the smallest cycle. If there are multiple propagation constants, then there are N $PV[\beta(\omega)l]$ waveforms. Therefore, $f_1$ should be smaller than the smallest periodicity among the N first cycles, and the maximum frequency step should be smaller than the smallest periodicity among all cycles.

Computing the periodicity in $PV[\beta_i(\omega)l]$, though possible, is often difficult, especially when the periodicity changes with frequency. Thus, simulator 100 utilizes the below approximate equivalent sufficient conditions that do not require computing the periodicities in $PV[\beta_i(\omega)l]$:

$$f_1 < f_{c_{lb}}, \quad (28)$$

and $$f_{k+1} - f_k < f_{c_{lb}}, \quad (29)$$

where $f_{c_{lb}}$ is the lower bound of the periodicity of any cycle of $PV[\beta_i(\omega)l]$ and is given by:

$$f_{clb} = \frac{c}{l\sqrt{\varepsilon_{r_{ub}}}} \quad (30)$$

where the quantity $\varepsilon_{r_{ub}} \in \mathbb{R}$ is any upper bound for the relative dielectric constant of the substrate. If $\varepsilon_{r_{ub}}$ is unknown, simulator 100 chooses a sufficiently large yet practical value, e.g., $\varepsilon_{r_{ub}}=15$. If $\varepsilon_{r_{ub}}$ is unknown but an upper bound for the propagation delay across the lines, $t_{p_{ub}}$, is within the input data, then $f_{c_{lb}}$ may be alternatively obtained as:

$$f_{clb} = \frac{1}{t_{p_{ub}}}. \quad (31)$$

If $f_{c_{lb}}$ cannot be computed, then simulator 100 informs the user that discontinuity-detection-based phase unwrapping cannot be utilized, and a different phase-unwrapping algorithm may be utilized.

Example

As an exemplary demonstration of the necessity for the determination of sufficient conditions, a lossless transmission line of length 0.3 m with known S-parameters for 0-10 GHz (in steps of 10 MHz) is considered. Then, S-parameters at some frequencies are selectively removed. The unwrapped propagation constant and other transmission-line parameters are computed for three cases: (1) when all data is present, (2) when the data from zero frequency to 1 GHz is removed, and (3) when the data from 4.01 GHz to 6.15 GHz is removed. Ideally, the unwrapped phases for each case should match for at least the portion of the data set containing data present in all three cases, i.e., from 6.16 GHz to 10 GHz. However, FIGS. 8A and 8B show that this is not the case.

Figure 8A:
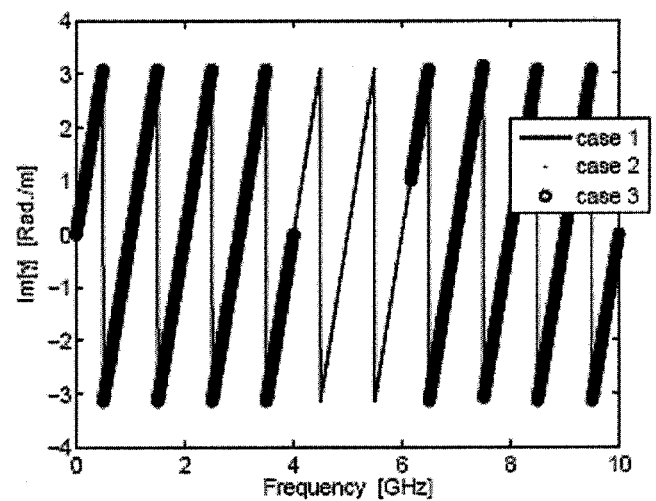
FIGS. 8A and 8B are plots of the wrapped phase contant and unwrapped phase constant, respectively, calculated as a function of frequency for three exemplary embodiments.
Figure 8B:
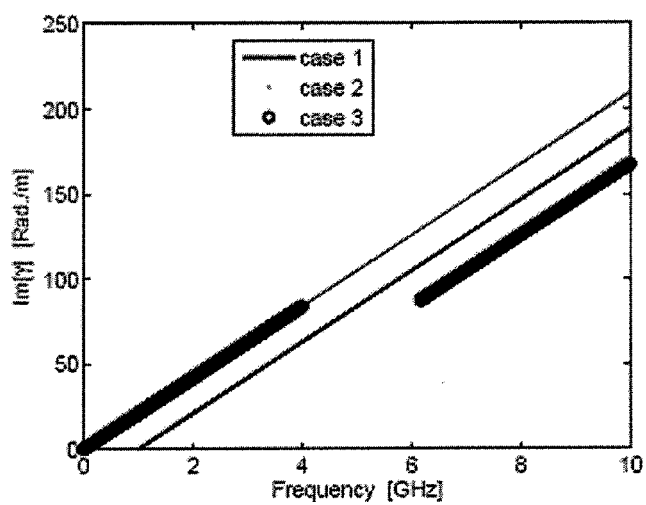
Figure 9A:
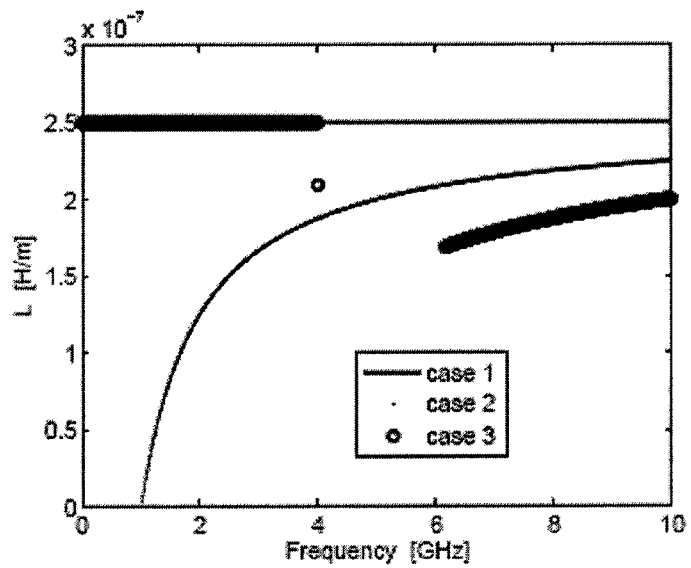
FIGS. 9A, 9B, and 9C are plots of calculated inductance, capacitance, and impedance, respectively, for the three embodiments of FIGS. 8A and 8B.
Figure 9B:
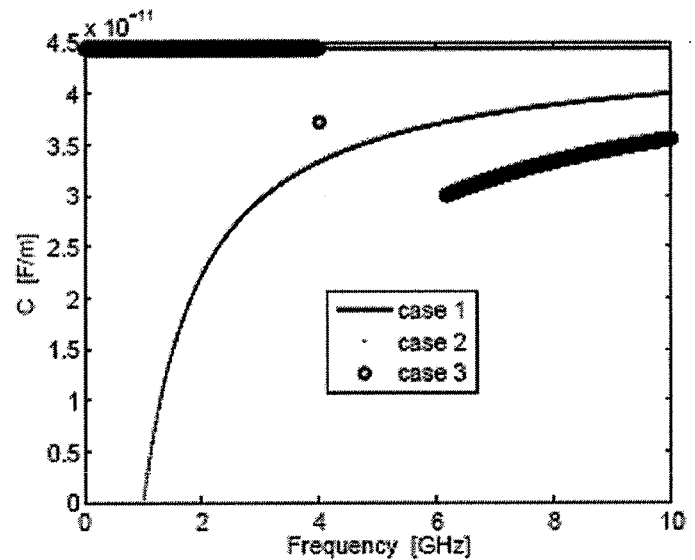
Figure 9C:
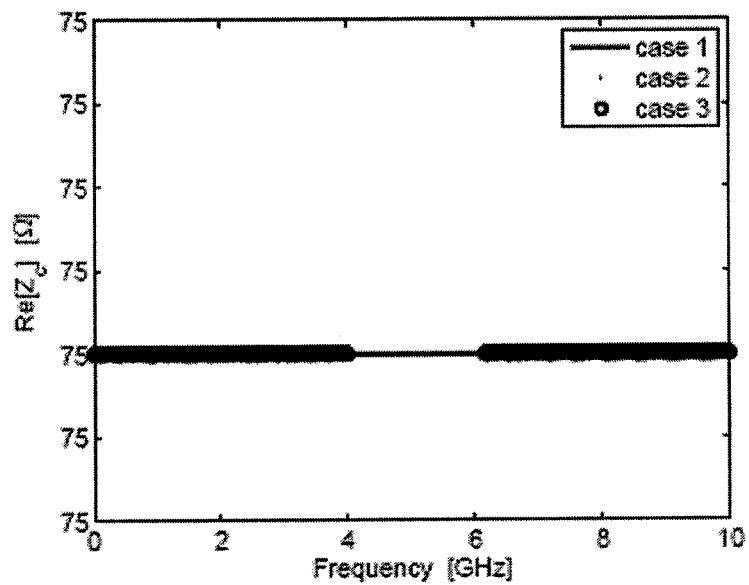

FIG. 8A illustrates the wrapped phase constant, which is periodic with frequency and has a periodicity of 1 GHz. FIG. 8B shows the unwrapped phase constants, which, contrary to expectation, are different for the three above-described cases in the frequency range of 6.16 GHz to 10 GHz from the three cases are different from each other, contrary to what was expected. This difference may lead to incorrect extraction of various transmission-line parameters, as shown in FIGS. 9A and 9B. FIGS. 9A and 9B depict, respectively, the calculated inductance and capacitance for the three different cases. As shown, these values differ for each case (and are thus incorrectly calculated in cases 2 and 3), even in the frequency range 6.16 GHz to 10 GHz. In contrast, FIG. 9C depicts the calculated characteristic impedance for all three cases. Since the impedance depends only on the wrapped phase constant, agreement among the impedance values for the three cases is obtained, as expected.

Singularities Arising from the Inverse Hyperbolic Sine Function

As described above, the characteristic impedance matrix $Z_c(\omega)$ is generally computed from equation (20). This computation is prone to numerical problems because of a singularity of the quantity $(\sin h(\gamma(\omega)l))^{-1}$ in equation (20)—a condition where $|\sin h(\gamma_{i,i}(\omega_k)l)| \approx 0$. The frequency at which singularity occurs is referred to as a singular frequency, $f_s$. Herein, the set of all $f_s$ is denoted as $f_s$. At each $f_s$, there is a discontinuity in $Z_c(\omega)$, which is a nonphysical artifact of this mathematical operation. Therefore, in preferred embodiments, at $f_s$, $Z_c(\omega)$ is computed differently from the equation (20) formualation.

This singularity issue arises mostly in lossless lines. In all lines (lossy or lossless), the quantity $\beta_i(\omega_k)l$ may be close to $n\pi$, where $n=0,1,2,\ldots$, at some $\omega_k$. In addition, in lossless lines, $\gamma_i(\omega_k)l$ is imaginary, making $|\sin h(\gamma_i(\omega_k)l)|\approx 0$ at these frequencies. For lossy lines, however, this situation generally does not arise, because the attenuation constant, $\alpha_i(\omega)$, is nonzero for f>0 and for all i, and $|\sin h(\gamma(\omega_k)_il)|\neq 0$ for f>0. However, for lossy lines, a singularity may still arise at f=0, described below in the next section.

To prevent artificial discontinuities in $Z_c(\omega)$, simulator 100 proceeds as follows. First, the input data is characterized as lossless or lossy. If the data is lossy, simulator 100 calculates the characteristic impedance matrix as described above. However, if the data is lossless, simulator 100 identifies singular frequencies in the data before $Z_c(\omega)$ is computed. The singular frequencies usually correspond to non-negative integer multiples of half wavelengths. This identification may be performed by verifying whether or not $|\sin h(j\beta_i(\omega_k)l)|$ is numerically close to zero at each k. However, generally, for a spike to occur in $Z_c$, the quantity $|\sin h(j\beta_i(\omega_k)l)|$ need not even be close to zero—it must only be "small," i.e., below a threshold that may change from data set to data set. Thus, simulator 100 defines, for each input data set, a threshold, t, the smallest value of $|\sin h(j\Delta\beta_i(\omega_k)l)|$, $\forall k$, $\forall i$, where $\Delta\beta_i(\omega_k)=\beta_i(\omega_{k+1})-\beta_i(\omega_k)$. As may readily be shown, $|\sin h(j\beta_i(\omega_k)l)|\geq t$ $\forall f_k \notin f_s$. In some embodiments, simulator 100 may utilize a threshold t even smaller than that defined above. Thus, simulator 100 identifies singular frequencies as whose for which the above inequality is not true.

At each singular frequency $f_s$, the matrix $Z_c(\omega)$ is computed by simulator 100 as the average of $Z_c(\omega)$ at the two frequencies on either side of $f_s$:

$$Z_c(\omega_k) = \begin{cases} 0.5Z_c(\omega_{k-1}) + 0.5Z_c(\omega_{k+1}), & 1 < k < N_f \\ Z_c(\omega_{k+1}), & k = 1 \\ Z_c(\omega_{k-1}), & k = N_f \end{cases} \quad (32)$$

In this manner, the characteristic impedance matrix is extracted without introducing artificial discontinuities, and thus so are the transmission-line parameters of the transmission-line system.

Transmission-Line Parameter Extraction at Zero Frequency

At $\omega=0$, computing $Z_c(\omega)$, $R(\omega)$, $L(\omega)$, $G(\omega)$, and $C(\omega)$ for a lossy transmission-line system may result in artificial discontinuities in some embodiments or applications. In the extraction method described above, extracting L(0) and C(0) (see equations (24) and (26)) may result in undefined quantities due to, e.g., division by zero. And, it is generally not possible to compute L(0) and C(0) from only the input-data network parameters at $\omega=0$, as these parameters at $\omega=0$ do not contain any information about L and C (instead they contain information only about R and G). Thus, to accurately compute L(0) and C(0) without introducing artificial discontinuities, the network parameters, or equivalently, the L and C values, at neighboring frequencies may be utilized to extrapolate L(0) and C(0).

In other embodiments, a different procedure is proposed to compute $R_{DC}$ and $G_{DC}$ from S(0). For $Y(\omega)\in C^{2N\times 2N}$, the open-circuit impedance parameters, and $Z(\omega)\in C^{2N\times 2N}$, the short-circuit impedance parameters, then, for small values of $\alpha_{i_{DC}}$, it may be shown that:

$$R_{DC} \approx \frac{1}{l} Y_{1:N,1:N}(0)^{-1}, \quad (33)$$

and $$G_{DC} \approx \frac{1}{l} Z_{1:N,1:N}(0)^{-1}. \quad (34)$$

Equations (33) and (34) are good approximations because $\alpha_{i_{DC}}$ of most transmission lines are usually small. For transmission lines, $R_{DC}$ and $G_{DC}$ are generally small; therefore, the matrices $Y_{1:N,1:N}(0)$ and $Z_{1:N,1:N}(0)$ are usually not singular. Once $R_{DC}$ and $G_{DC}$ are computed by simulator 100, the matrix $Z_c(0)$ is computed when $\alpha_{DC}=0$ from:

$$Z_c(0) = \begin{cases} 0, & R_{DC} = G_{DC} \neq 0, \\ \infty, & R_{DC} \neq G_{DC} = 0, \\ (L(0)C(0))^{\frac{1}{2}}L(0), & R_{DC} = G_{DC} = 0, \\ (R_{DC}G_{DC})^{\frac{1}{2}}R_{DC}, & R_{DC} \neq G_{DC} \neq 0, \end{cases} \quad (35)$$

In this manner, simulator 100 extracts accurrate transmission-line parameters at zero frequency without introducing artificial discontinuities.

Example

As an exemplary demonstration of the solution described above, S-parameters for a lossless transmission line having a length of 75 mm were obtained from a commercial microwave simulator. DC losses were then introduced into the data, and the values of DC resistance, conductance, and impedance were calculated both with and without the above-described correction. FIGS. 10A and 10B respectively depict the comparison of the results thus obtained (the abbreviation "NaN," or "not-a-number" in FIG. 10A denotes an invalid value). As shown in FIGS. 10A and 10B, only when both $R_{DC}$ and $G_{DC}$ are non-zero are the correct values obtained when the correction is not utilized. FIG. 10B shows that, with the correction described above, correct values are obtained for all values of $R_{DC}$ and $G_{DC}$.

Improved Simulation

Figure 11:
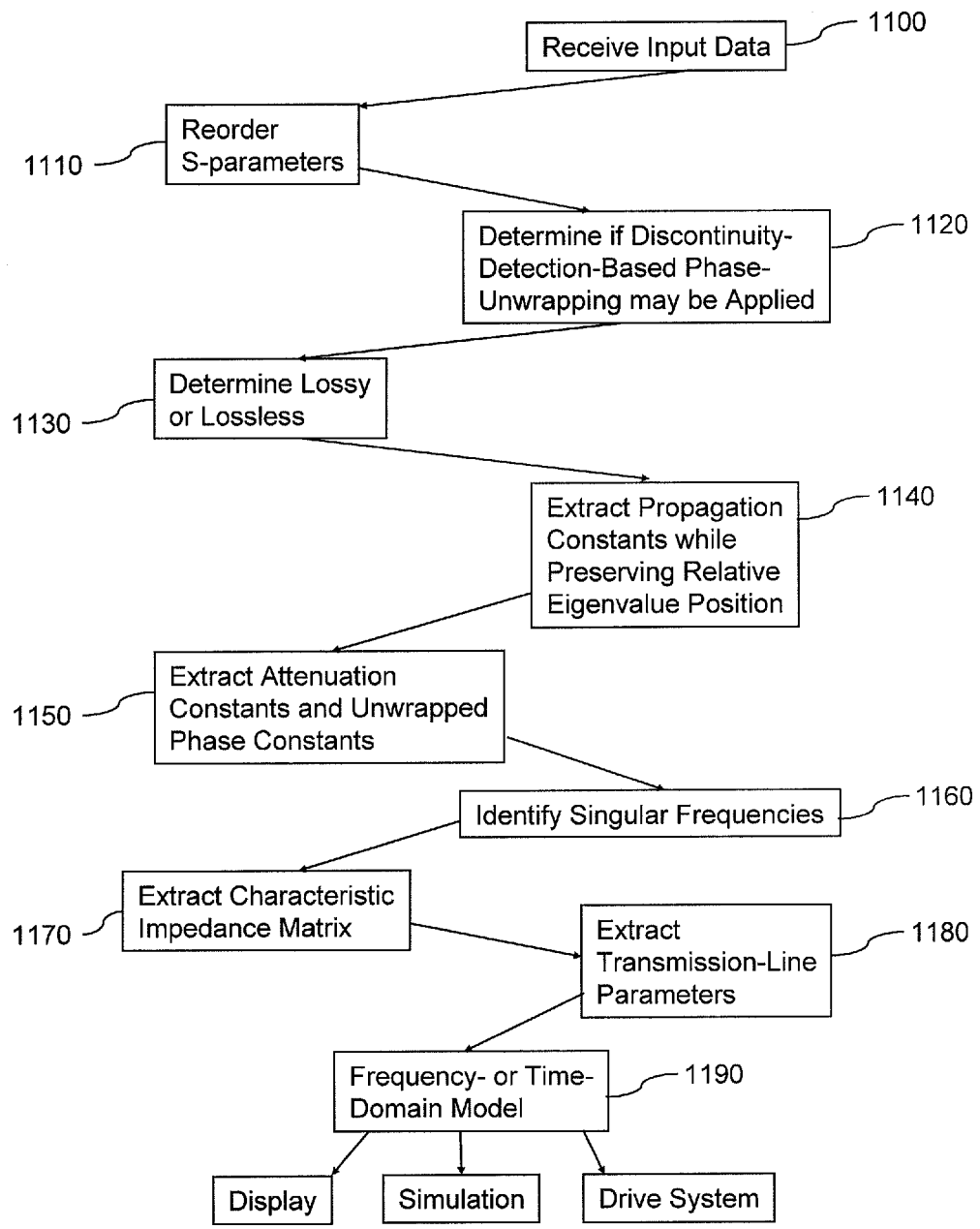
FIG. 11 is a schematic flowchart of an exemplary improved simulation method in accordance with various embodiments of the invention.

FIG. 11 schematically depicts an improved simulation method in accordance with the above-described embodiments. As described above with reference to FIG. 3, in the first two steps 1100 and 1110, simulator 100 receives the input data and reorders the network parameters in order of increasing frequency, if necessary. In step 1120, simulator 100 determines if discontinuity-detection-based phase unwrapping may be reliably applied via the conditions given above in equations (28) and (29). If the conditions are not met, simulator 100 may terminate the simulation with an appropriate error message on display 135. In step 1130, analysis module 145 determines if the transmission-line system corresponding to the input data is lossless or lossy. Specifically, if the singular values of the input-data network parameters are unity for all frequencies, the transmission-line system is considered to be lossless (as described above).

Next, similar to step 320 described in relation to FIG. 3, the wrapped propagation constants are extracted in step 1140. However, unlike the embodiment depicted in FIG. 3, the relative positions of the eigenvalues are preserved during the extraction step by tracking eignvector position, as described in detail above. In step 1150, the attenuation constants and unwrapped phase constants are extracted utilizing discontinuity-detection-based phase unwrapping. If the transmission-line system was identified as lossless in step 1130, in step 1150, any random fluctuations in the sign of the phase constant are corrected as described above.

In step 1160, analysis module 145 identifies all singular frequencies in the input data, as described above. Then, in step 1170, the characteristic impedance matrix is extracted. For all non-singular frequencies, the characteristic impedance is calculated utilizing equation (20) above, and, if the transmission-line system is lossless, then the characteristic impedance is calculated at the singular frequencies utilizing equation (32) above. In step 1180, the transmission-line parameters are extracted. Specifically, the RLGC parameters are calculated utilizing equations (23)-(26) above for all non-singular frequencies. And, as in step 1170, if the transmission-line system is lossless, the RLGC parameters are calculated at the singular frequencies utilizing equation (32) above. Further, if the first frequency in the input data is equal to zero and is a singular freqency, $L(0)$ and $C(0)$ are calculated using extrapolation, as describe above, and $R_{DC}$, $G_{DC}$, and $Z_c(0)$ are calculated using equations (33), (34), and (35), respectively.

Finally, as in step 350 of FIG. 3 described above, the transmission-line parameters extracted in step 1180 are utilized in a frequency- or time-domain simulation by simulation module 150 in step 1190. The outputs of such simulations may be utilized as inputs for further simulations or may be displayed in text or graphical form, e.g., on display 135. The outputs may also be utilized to drive actual systems, e.g., the output of a transient simulation of a transmission-line system may be utilized to drive an external electronic circuit 180 connected to simulator 100 via, e.g., an analog/digital converter.

In this manner, the full set of transmission-line parameters is extracted without introducing artificial discontinuities. Further, the memory complexity of the simulation method of FIG. 11 is $O(N^2 N_f)$, and its time complexity is $O(N^3 N_f)$. The time complexity of this embodiment of the invention is much superior to that of the algorithm proposed in the Knockaert reference (the complexity of which is exponential with the number of transmission lines N), and its numerical robustness and accuracy are vastly superior to existing formulations based on discontinuity-detection-based phase unwrapping algorithms. Thus, embodiments of the present invention are readily scalable to simulate transmission-line systems having large numbers of transmission lines with accuracy and speed not found in the prior art.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A custom computing apparatus comprising:
    at least one processor;
    a memory coupled to the at least one processor; and
    a storage medium coupled to the memory and the at least one processor, the storage medium comprising a set of processor executable instructions that when executed by the at least one processor configure the custom computing apparatus to determine performance of a transmission-line system in response to an electrical input, the configured custom apparatus comprising:
    an input module for receiving in the memory ABCD parameters of a transmission-line system comprising a plurality of transmission lines;
    an analysis module configuring the processor and the memory for extracting transmission-line parameters of the transmission-line system from the ABCD parameters using discontinuity-detection-based phase unwrapping,
    wherein the phase unwrapping comprises configuring the processor to perform: (i) extraction and storage in the memory of propagation constants associated with the plurality of transmission lines, (ii) determination of eigenvalues of A matrix of the ABCD parameters for each frequency in a set of frequencies corresponding to the electrical input, and (iii) preservation in memory a position of each eigenvalue with frequency by moving at least one eigenvalue in a matrix, preventing introduction of artificial discontinuities during the extraction of transmission-line parameters; and
    a simulator module configuring the processor for estimating a response of the transmission-line system to the electrical input, the response being based at least in part on the extracted transmission-line parameters stored in the memory.

2. The apparatus of claim 1, wherein the transmission-line system is lossy.

3. The apparatus of claim 1, wherein the transmission-line system is lossless.

4. The apparatus of claim 1, further comprising a de-embedding module for (a) receiving the ABCD parameters from a measurement system or an electromagnetic field solver, (b) removing measurement artifacts from the ABCD parameters, and (c) sending the ABCD parameters to the input module.

5. The apparatus of claim 1, wherein the estimated response of the transmission-line system is a time-dependent response.

6. The apparatus of claim 1, further comprising an output module for supplying the estimated response to at least one of a display, a device, or another simulator module.

7. The apparatus of claim 1, wherein, prior to extracting the transmission-line parameters, the analysis module analyzes the ABCD parameters to test the applicability of discontinuity-detection-based phase unwrapping.

8. A method of simulating a transmission-line system comprising a plurality of transmission lines, the method comprising:
    receiving in memory ABCD parameters of the transmission-line system in response to an electrical input;
    extracting by a processor transmission-line parameters of the transmission-line system, using discontinuity-detection-based phase unwrapping,
    wherein the phase unwrapping comprises: (i) extraction by the processor, based on the ABCD parameters in the memory, of propagation constants associated with the plurality of transmission lines, (ii) determination by the processor, based on the ABCD parameters in the memory, of eigenvalues of A matrix of the ABCD parameters for each frequency in a set of frequencies, and (iii) preservation by the processor in memory a position of each eigenvalue with frequency by moving at least one eigenvalue in a matrix, preventing introduction of artificial discontinuities during the extraction of transmission-line parameters; and simulating by the processor a response of the transmission-line system to an electrical input, based on the extracted transmission-line parameters.

9. The method of claim 8, wherein receiving the ABCD parameters comprises receiving the ABCD parameters from a circuit solver.

10. The method of claim 8, wherein receiving the ABCD parameters comprises (a) receiving the ABCD parameters from a measurement system or an electromagnetic field solver, and (b) removing measurement artifacts from the ABCD parameters.

11. The method of claim 8, further comprising, prior to extracting the transmission line parameters, analyzing the ABCD parameters to test the applicability of discontinuity-detection-based phase unwrapping.

12. The method of claim 8, wherein the transmission-line system is lossy.

13. The method of claim 8, wherein the transmission-line system is lossless.

14. The method of claim 8, wherein the simulated response of the transmission-line system is a time-dependent response.

15. The method of claim 8, wherein the simulating step produces simulated output values from a transmission-line system modeled based on the extracted parameters.

16. The method of claim 15, further comprising using the output values to drive a device.

17. The method of claim 15, further comprising using the output values to drive a second simulation.

* * * * *